United States Patent [19]

Treiman et al.

[11] Patent Number: 6,043,893
[45] Date of Patent: Mar. 28, 2000

[54] MANUALLY PORTABLE REFLECTANCE SPECTROMETER

[75] Inventors: Allan H. Treiman, Seabrook; Tad D. Shelfer, Houston, both of Tex.

[73] Assignee: Universities Space Research Association, Columbia, Md.

[21] Appl. No.: 09/168,926

[22] Filed: Oct. 9, 1998

[51] Int. Cl.[7] ........................................... G01J 3/46
[52] U.S. Cl. .............................................. 356/402
[58] Field of Search ........................ 356/420, 402–411, 356/445–448, 326, 300, 328, 425, 73; 250/226; D10/46, 80, 81, 76; 434/98, 101–104, 298, 300–303, 331–364; D24/216

[56] References Cited

U.S. PATENT DOCUMENTS

| | | |
|---|---|---|
| H780 | 5/1990 | Hartman . |
| 3,554,648 | 1/1971 | Boostrom et al. . |
| 3,829,218 | 8/1974 | Alyanak . |
| 3,876,306 | 4/1975 | Onodera et al. . |
| 4,049,353 | 9/1977 | Missio . |
| 4,560,275 | 12/1985 | Goetz . |
| 4,636,081 | 1/1987 | Saitoh et al. . |
| 4,986,665 | 1/1991 | Yamanishi et al. . |
| 5,475,221 | 12/1995 | Wang . |
| 5,519,219 | 5/1996 | Alexay et al. . |
| 5,754,283 | 5/1998 | Keane et al. . |

OTHER PUBLICATIONS

Joseph Schnable et al.: Low–Cost Colorimeter; Electronics Experimenter's Handbook—Summer 1995.
Allan H. Treiman: Alta® Reflectance Spectrometer—Introduction And Classroom Lessons—Published Aug. 1998.

Primary Examiner—K. P. Hantis
Attorney, Agent, or Firm—John Gibson Semmes

[57] ABSTRACT

Manually portable reflectance spectrometer and method of detection of absorption and reflection of light, wherein the visible and invisible (infrared) light is derived from LEDs. A phototransistor or photodiode measures the light reflected by the surface being measured, and a digital converter ADC translates the phototransistor's output into a digital format display. Three or more LEDs blue, aqua, green, yellow, orange, crimson, red and infrared provide a range of readings across the visible and infrared spectrum.

5 Claims, 10 Drawing Sheets

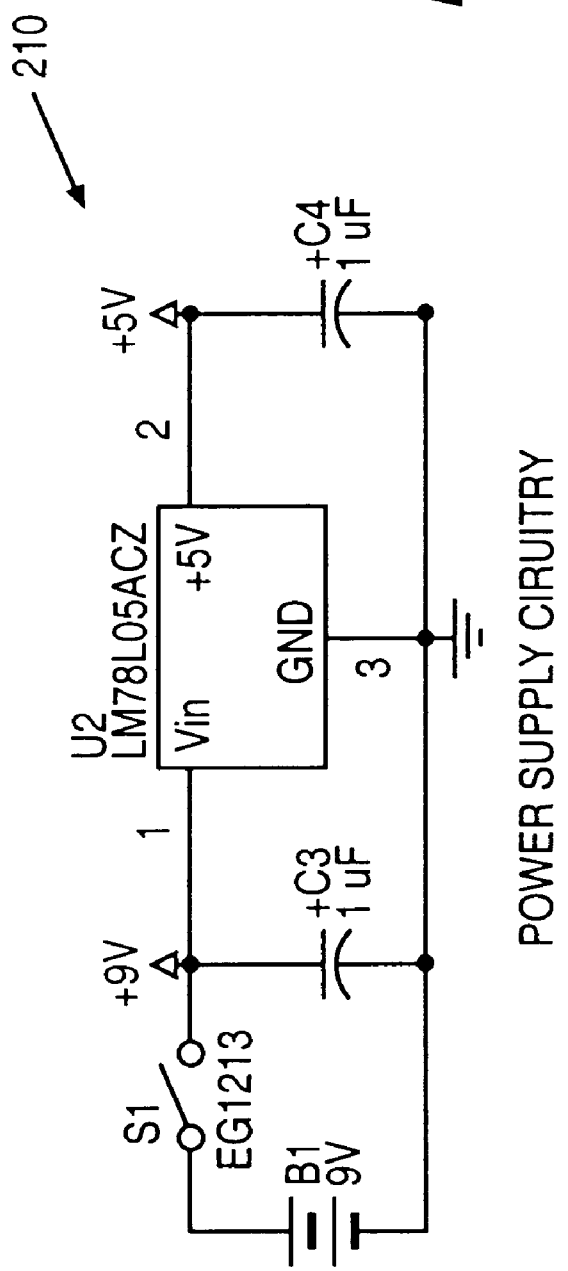

| | | LESSON 3: DATA SHEET 1. | | | |
|---|---|---|---|---|---|
| CLASS: _____ DATE: _____ | | | | | |
| SCIENTIST(S): _____ | | | | | |
| | | DARK VOLTAGE (mV): | | | |
| | | VOLTAGE (mV) | | | |
| COLOR | LIGHT WAVELENGTH | LEAF 1: | STANDARD: WHITE PAPER | UNKNOWN 2: | UNKNOWN 3: |
| BLUE | 470 NM | | | | |
| GREEN | 555 NM | | | | |
| YELLOW | 585 NM | | | | |
| AMBER | 605 NM | | | | |
| ORANGE | 635 NM | | | | |
| CRIMSON | 660 NM | | | | |
| RED | 695 NM | | | | |
| INFRARED 1 | 880 NM | | | | |
| INFRARED 2 | 940 NM | | | | |

*FIG. 4A*

| | | LESSON 3: WORKSHEET FOR CALCULATING REFLECTANCE. (SIMPLE) | | |
|---|---|---|---|---|
| CLASS: _____ DATE: _____ | | | | |
| SCIENTIST(S): _____ | | | | |
| | | VOLTAGE (mV): | | REFLECTANCE |
| COLOR | LIGHT WAVELENGTH | SAMPLE: | STANDARD: WHITE PAPER | (SAMPLE VOLTAGE ÷ STANDARD VOLTAGE) |
| BLUE | 470 NM | | | |
| GREEN | 555 NM | | | |
| YELLOW | 585 NM | | | |
| AMBER | 605 NM | | | |
| ORANGE | 635 NM | | | |
| CRIMSON | 660 NM | | | |
| RED | 695 NM | | | |
| INFRARED 1 | 880 NM | | | |
| INFRARED 2 | 940 NM | | | |

*FIG. 4B*

MANUALLY PORTABLE REFLECTANCE SPECTROMETER

U.S. GOVERNMENT RIGHTS

This invention was created in part with United States government financial support. The U.S. government thus has a royalty-free license and right to require the patent owner to sublicense others on reasonable terms.

RELATED DISCLOSURE

DISCLOSURE DOCUMENT NO. 412302 filed Feb. 18, 1997.

of low-cost, quantitative, portable reflectance spectrometers that can access invisible light.

There is considerable prior art in the development and mechanisms and operation of reflection spectrometers, reflection spectrophotometers, calorimeters, and like devices for measuring the proportion of light of variable wavelength that is reflected or scattered from materials. None of these prior art media or apparatus address the need in the classroom for a low-cost, quantitative instrument that can obtain reflectance measurements in visible and invisible light. Accordingly, the invention comprises a manually portable, hand-held method and personalized apparatus for reflectance spectometry.

| INVENTOR | DATE | PAT. NO. | DESCRIPTION |
|---|---|---|---|
| PRIOR ART (PRIMARY) | | | |
| Boostrom et al. | 1971 | 3,554,648 | Teaching Aid and Modular Instrumental Analysis System and Components |
| Alyanak | 1974 | 3,829,218 | Method of Spectral Analysis |
| Onodera et al. | 1975 | 3,876,306 | Method of State-Differentiating Analysis |
| Missio | 1977 | 4,049,353 | Spectrometric System and Cassette |
| Goetz | 1985 | 4,560,275 | Portable Reflectance Spectrometer |
| Saitoh et al. | 1987 | 4,636,081 | Apparatus for Reading Color Image |
| Hartman | 1990 | Reg. No. H780 | Optical Data Processing Detection |
| Wang | 1995 | 5,475,221 | Optical Spectrometer Using LEDs |
| Alexay et al. | 1996 | 5,519,219 | Portable Filter Infrared Spectrometer |
| PRIOR ART (SECONDARY) | | | |
| Isaacs et al. | 1975 | 3,874,799 | Color Spectrophotometry |
| Lambe et al. | 1979 | 4,164,374 | Spectrophotometer Utilizing a Solid State Source of Radiant Energy |
| Kaffka et al. | 1986 | 4,566,797 | Spectrophotometer for Operating Discrete Wavelengths |
| Howarth et al. | 1987 | 4,715,715 | Measuring the Color of a Material |
| Funt et al. | 1991 | 4,992,963 | Determining Ambient Light and Surface Reflectance |
| Brunsting et al. | 1993 | 5,189,495 | Light Suppression for Photometers |
| Schnable et al. | | Electronics Experimenter's Handbook, Summer 1995 - Low-Cost Colorimeter | |

BACKGROUND OF INVENTION

This invention relates to classroom instruction, concerning interactions between light and material targets, specifically to the teaching of absorption and reflection of light, comprising different spectral colors, including infrared light. The hand-held apparatus is adapted to experimentation by individual school students in grades 3–12 and beyond. It is identified in the trade as: ALTA® REFLECTANCE SPECTROMETER.

Reflectance spectroscopy and spectrometry comprise measurements of how light, i.e. electromagnetic radiation, of different spectral colors is reflected and absorbed by material objects. Modern reflectance spectroscopy, and its applications in environmental and planetary remote sensing, all rely particularly on invisible light, i.e. electromagnetic radiation of wavelengths that are not detectable by human eyes. Instruction in reflectance spectroscopy has thus become important as more and more environmental and planetary sciences come to rely on images and data which are based on light reflected from objects. The principles of reflectance spectroscopy are not intuitive to most students, and are greatly facilitated by the students' opportunity to acquire reflectance spectra themselves. Heretofore, the teaching of reflectance spectroscopy has been hampered by the absence

SUMMARY OF INVENTION

The device itself is a reflection spectrometer, which measures how much light of various colors does reflect off a target material or surface. This classroom reflection spectrometer is adapted to teaching grades 3–12 and beyond school students about light and remote sensing.

The present classroom reflection spectrometer comprises essentially at least three colored lights, including at least one that emits infrared (invisible) light, a centrally disposed photo-sensor, and a readout for the photo-sensor. In a six light configuration, the lights are commercial light-emitting diodes (LEDs) that span the visible and near infrared spectrum: 470 nm blue, 565 nm green, 590 nm yellow, 635 nm orange, 695 nm red, and 940 nm infrared. These LEDs are accurately set in an array about the photo-sensor, a photodiode. When a student pushes a color-coded switch pad to turn on a given LED, its light hits the target, and a portion of the light that reflects from the target and enters the photodiode. The photodiode's output voltage measures how much light is reflected by the target, amplifies it, and then it is digitized in an IC A-D converter. The converter thus drives a 3½ digit LCD panel display where its wavelength readout is expressed in millivolts.

The common concept between the known "colorimeter" and the present classroom reflection spectrometer is the use of light-emitting diodes (LEDs) as sources of pure color light. Nonetheless, the classroom reflection spectrometer herein differs from the calorimeter: in using infrared LEDs, of critical importance for remote sensing of the Earth and planets, but of no value at all for matching paints; in having a much-simplified electronic circuit that does not require a computer interface, an essential omission for classroom use; in requiring only a battery for power, essential for classroom use; and in having a rugged case, likewise essential for classroom use by the student.

The invention familiarizes the student with the utility of a spectrometer.

Exploring the differences between visible and invisible light is an objective of this invention.

Taking a reflectance spectrum is thus a primary objective of invention.

Determining color vision is another; observing earth from orbit is another. Evaluating soil moisture content is another; obtaining water pollution degree by water turbidity as a measure is yet another objective. Cloud detection, i.e. thickness and pollution is an objective. Planetary remote sensing is an objective, too.

The spectrometer may serve as part of a kit for the traditional classroom laboratory market; the kit may, for example, contain 4 spectrometers and a suite of curriculum materials for 30 students and a teacher. For the home school market, a single spectrometer unit, such as defined herein, may be accompanied by a somewhat revised set of materials; for the hobbyist market, the kit may consist of parts and assembly instructions with some suggested experiments and applications.

IN THE DRAWINGS

The numerical designations associated with respective specific keypad switch colors represent color wavelengths in nanometers, viz 470 blue, 550 green, etc.

FIG. 2A is a bottom view in perspective of the FIG. 1A top; whereas

FIGS. 3A, 3B and 3C illustrate circuit diagrams of the operational electronic elements of the Reflectance Spectrometer of FIGS. 1A, 1B, 2A, 2B and 2C.

FIGS. 4A–4J illustrate Lesson 3 of the Exercise Book, entitled ALTA® Reflectance Spectrometer: Introduction and Classroom Lessons.

DESCRIPTION OF PREFERRED EMBODIMENTS

Figure 1A:
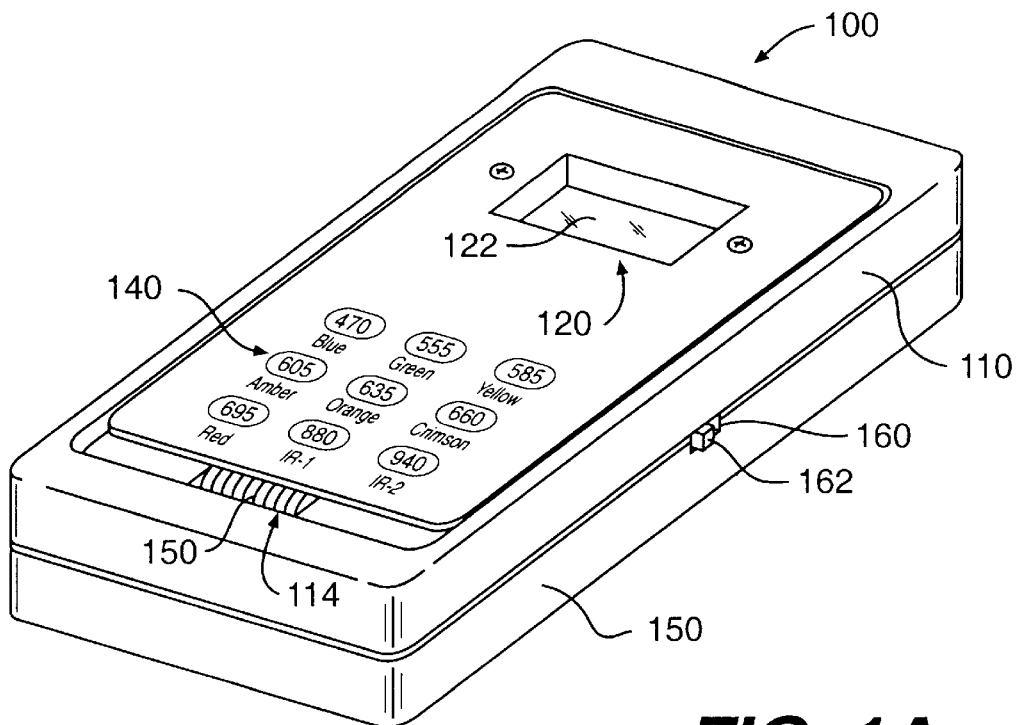
FIGS. 1A and 1B illustrate in perspective the top and bottom components respectively of external elements of the Hand Held Reflectance Spectrometer, in accordance with the invention.
Figure 1B:
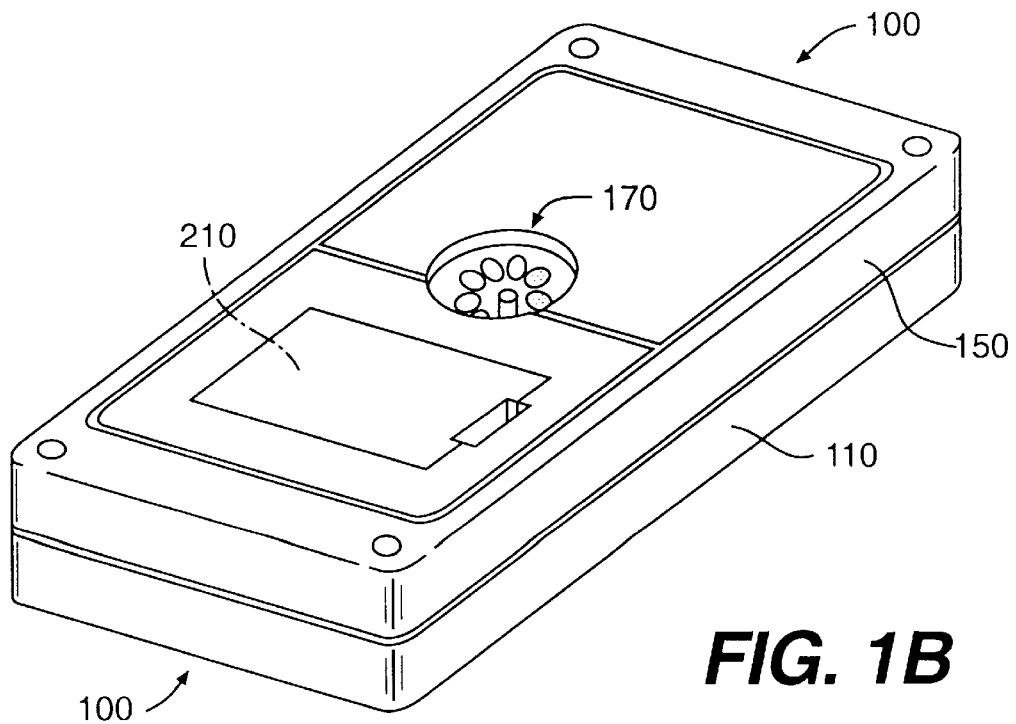
Figure 2A:
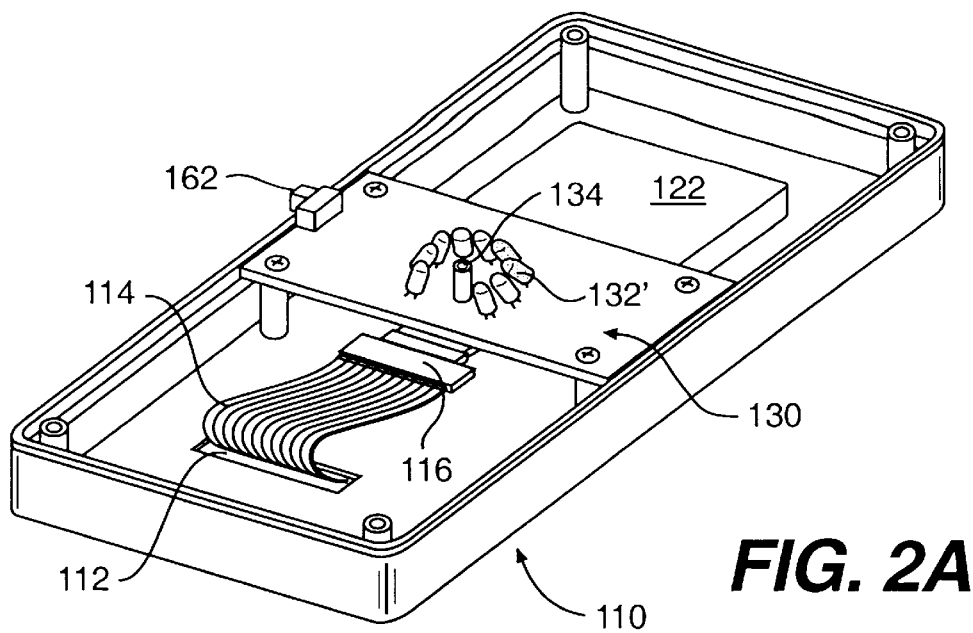

As indicated, a preferred embodiment of the Hand Held Reflectance Spectrometer is illustrated as assembled in FIG. 1A the top view, FIG. 1B the assembled bottom view; FIG. 2A the internal arrangement of spectrometer components, FIGS. 2B and 2C the lamp-sensor circuitboard relative to the infrared LEDs arrangement; and FIGS. 3A, 3B and 3C the enabling electronic circuitry and FIGS. 4A–4J of Lesson 3.

APPARATUS

The present Reflectance Spectrometer 100 is housed in a black plastic case composed of two superposed elements 110 and 150, wherein top compartment 110 is pierced twice. The keypad 140 is available on top. One aperture permits passage 112 of an electrically conductive strip 114 with electrical leads to conduct signals from color-coded switch keypad 140 to the main circuit board 130. The display aperture 120 in the case top allows the spectrometer's photodiode output on liquid crystal display (LCD) module 122 to be viewed by the operator. See FIGS. 1A and 2A.

The bottom compartment 150 of the case is also pierced twice. See FIG. 1B wherein case 100 is shown upside down. One aperture 160 allows access to the on/off switch 162, also identified as S-1 of FIG. 3A. Light access aperture 170 in the case bottom 150 allows light from the colored LED lamps 132, 132' to exit the case, and it also allows reflected light from an exterior target to enter the case for impingement on photodiode light sensor 134. See FIGS. 1B and 2C.

All interior components, except the 9 v battery, are affixed to top compartment 110 of the case; the battery 210, see B-1 in FIG. 3A, sets in a housing which is at the bottom of the case compartment 150. A printed circuit board 130 containing substantially all electronic components 200 is affixed directly to top compartment 110. As in FIG. 1B, light access aperture 170 is located so that, when top and bottom compartments 110–150 are assembled, aperture 170 will be spaced and centered on opposed light sensor 134, reference FIGS. 2B and 2C. This light access aperture 170 is of such a diameter and disposition that the opposed LED lamps 132 will then effectively project their light outside of the assembled case 100.

Figure 2B:
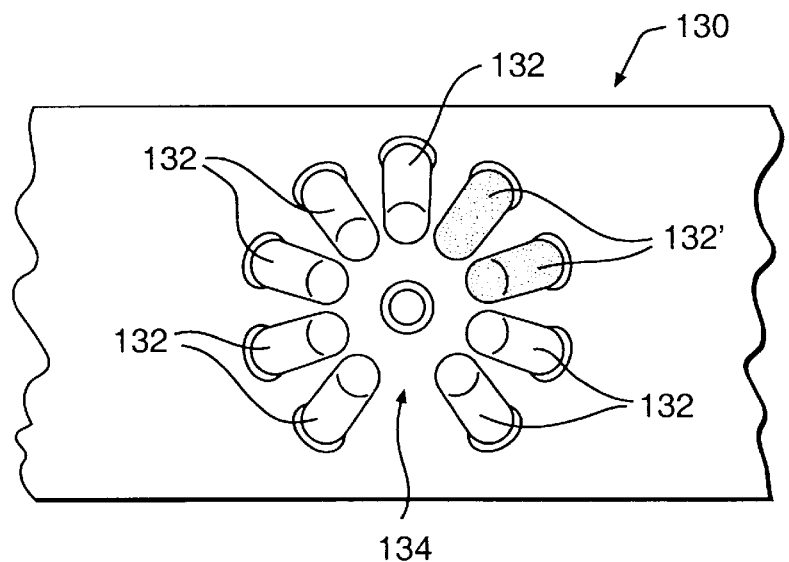
FIGS. 2B and 2C illustrate an enlarged fragmentary view of the LEDs and photodiode light sensor.
Figure 2C:
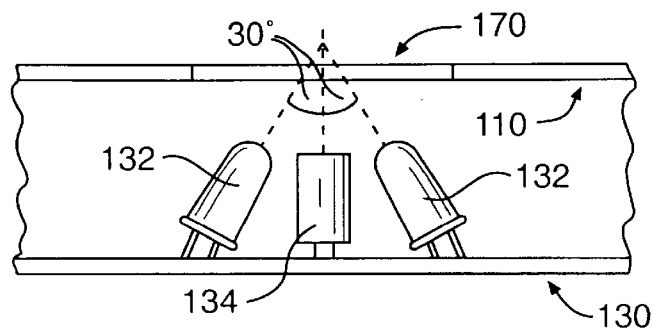

All electronic components except the LCD module 122, the switch keypad 140, and the battery B-1 of power supply circuit 210 are soldered to the printed circuit board 130 of FIGS. 2B and 2C. The LCD module 210 and the battery B-1 are thus each connected to the circuit board 130 inside the assembled case. The switch keypad 140 has connection via the pressure sensitive switches to the circuit board 130, by means of a flat ribbon wire 114 and a matching header 116. See FIGS. 1A and 2A. On the circuit board 130, the photodiode light sensor 134 is mounted so that its long axis, the axis of its greatest sensitivity to light, is perpendicular to circuit board 130 and similarly to the bottom 150 of the case. See FIGS. 2A, 2B and 2C. The photodiode 134 is sheathed in an opaque cylinder extending from circuit board 130 to a point which, as a classroom model, extends 2 millimeters beyond the end of photodiode 134.

On the circuit board 130, the bases of respective LED lamps 132 are arranged in a circle, centered on the point at which the photodiode 134 is soldered to the circuit board. Each LED lamp 132 is tilted angularly such that the brightest light emission thereof is directed angularly toward the axis of photodiode 134 see FIG. 2C. That LED vector intersects the vertical of the projected photodiode axis at an angle of approximately 30°. The circuit board 130 itself is located at a preselected distance from the case bottom 150 such that its light access hole 170 intersects LED emission vectors; likewise the extended, interfering axis of photodiode 134 is thus near the exterior surface of bottom case compartment 150. See FIGS. 2A and 2B.

The physical arrangements of the LED lamps 132, photodiode 134, and case bottom compartment 150 are critical to the proper operation of the Hand Held Reflectance Spectrometer. See FIG. 2C. Angling the light emission axes of the LED lamps toward the projected vertical axis of photodiode sensitivity thus ensures that sufficient light from the LED lamps will strike the investigated object or its surface, whereby reflected or scattered light will have sufficient intensity to be detected by the photodiode. Some mirror-like or specular reflection of light from the LED lamps into the photodiode is unwanted, it is accordingly prevented by: placement of the sensitivity axis "X" of the photodiode 134 perpendicular to the exterior surfaces of the case bottom compartment 150, and therefore perpendicular to the object or surface to be analyzed, i.e. emission angle of 90°, and placement of the LED lamps 132. Thus specular reflections of their light emissions are not directed into the sensitive axis of the photodiode.

Appropriate disposition is made of the LED lamps 132 such that their axes of brightest emission respectively are at a moderate incidence angle to the sensitivity axis of the photodiode 134. The preferred selected incidence angle of 30° between the plural LED emission axes and the photodiode 134 sensitivity axis is shown in FIG. 2C. With this angular relationship between light source, target under investigation, and light detector, a single measurement of reflectance yields a good approximation to total reflectance, averaged over all incidence and emission angles. In support of this concept, if the incidence angle of respective LED lamp emission axes were substantially closer to 0°, specular or mirror-like reflections from the object or target surface would dominate the amount of light entering the light sensor photodiode, and measurement of intrinsic reflectance properties would be rendered impossible. On the other hand, if the incidence angle of respective LED lamp emission axes were closer to 90°, i.e. parallel to the surface or object to be measured, the exact placement and presence of surface irregularities in the target object or its surface tend to dominate the amount of light entering the photodiode 134, and measurement of intrinsic reflectance properties would likewise be impossible.

This Reflectance Spectrometer can be used alternately as a quantitative detector of the intensity of light from an outside source, rather than from its LED lamps. In this mode of operation, the Hand Held Reflectance Spectrometer is turned on via switch 180 and the LCD module 122 will display numbers corresponding to the intensity of light that strikes the photodiode 134, no matter what the source thereof.

ELECTRONIC CIRCUITRY

Figure 3B:
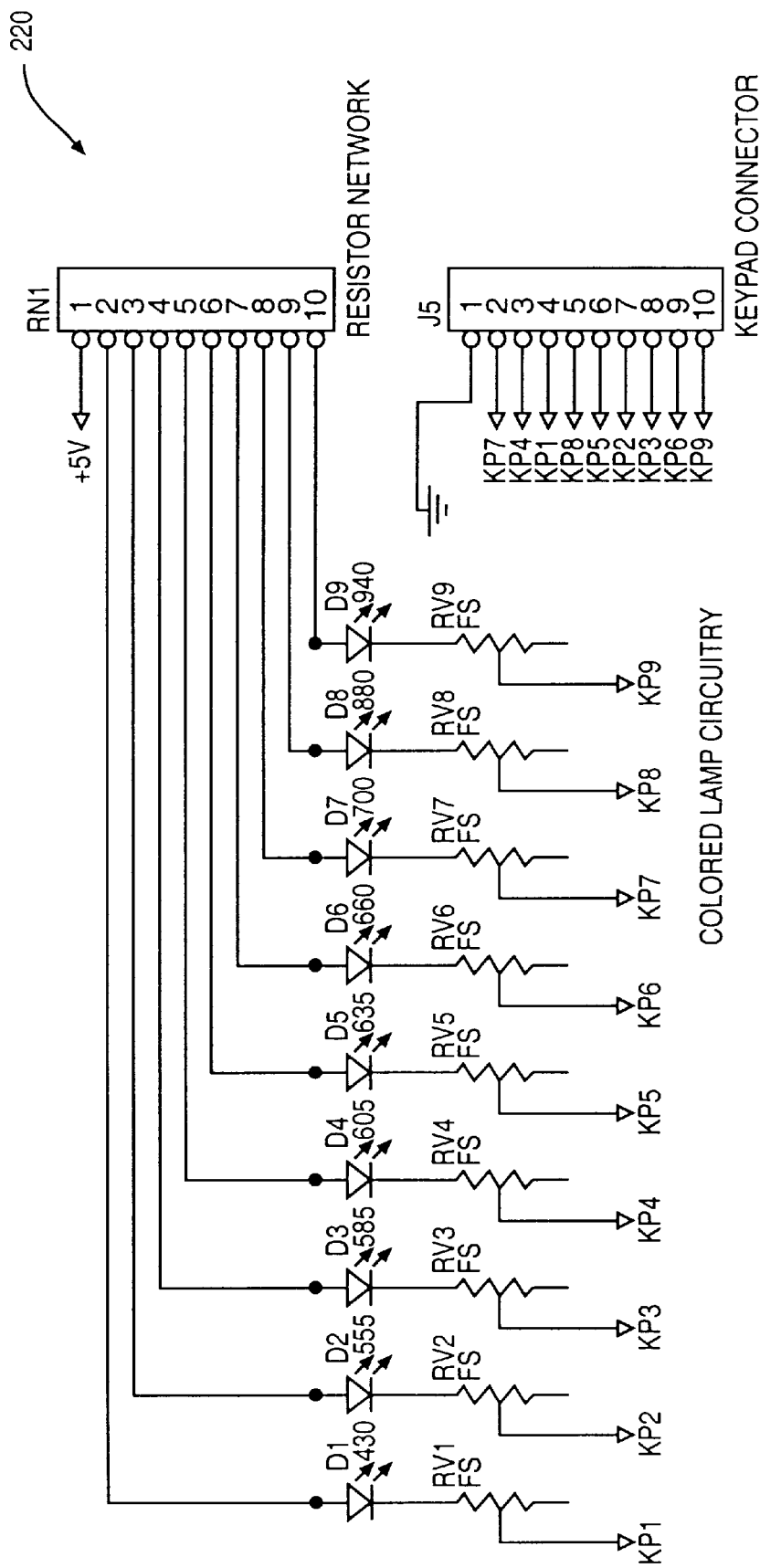
Figure 3C:
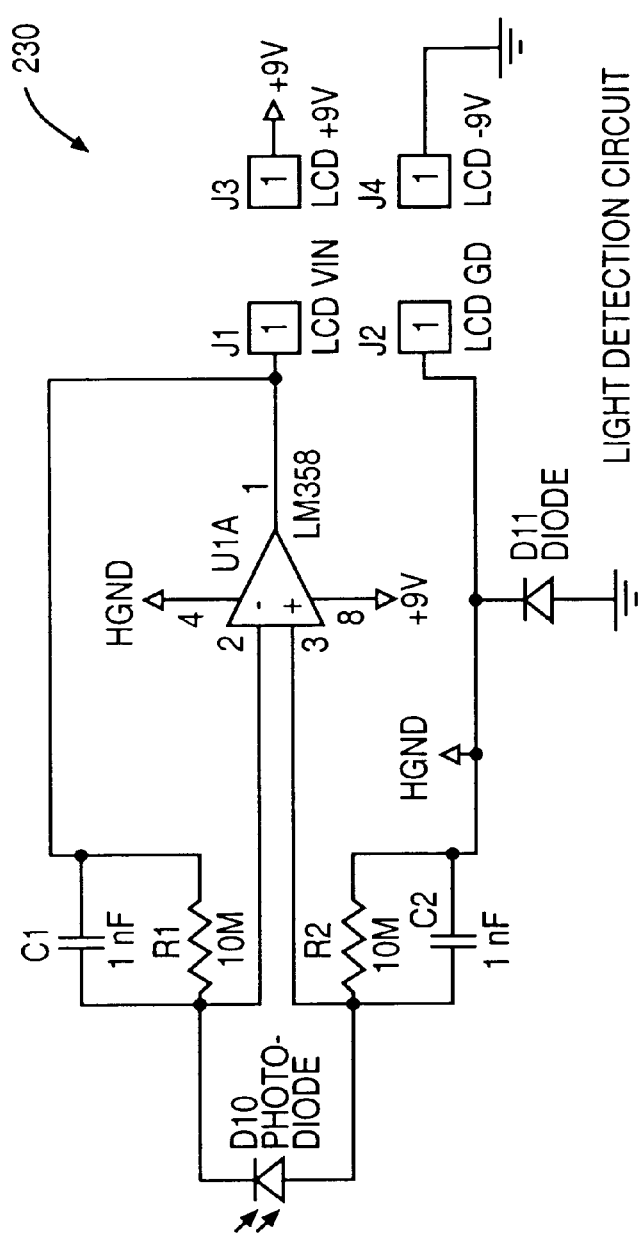
Figures 4C, 4D:
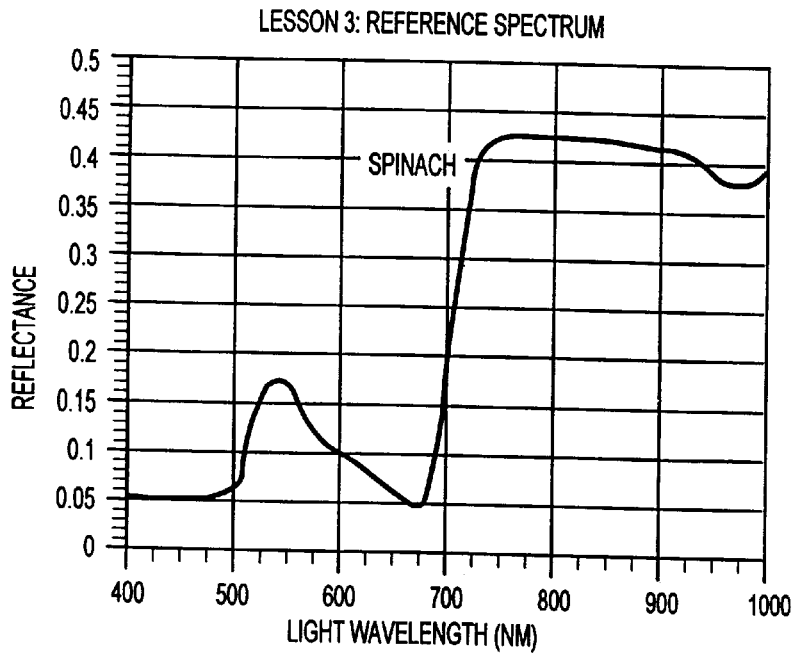
Figure 4E:
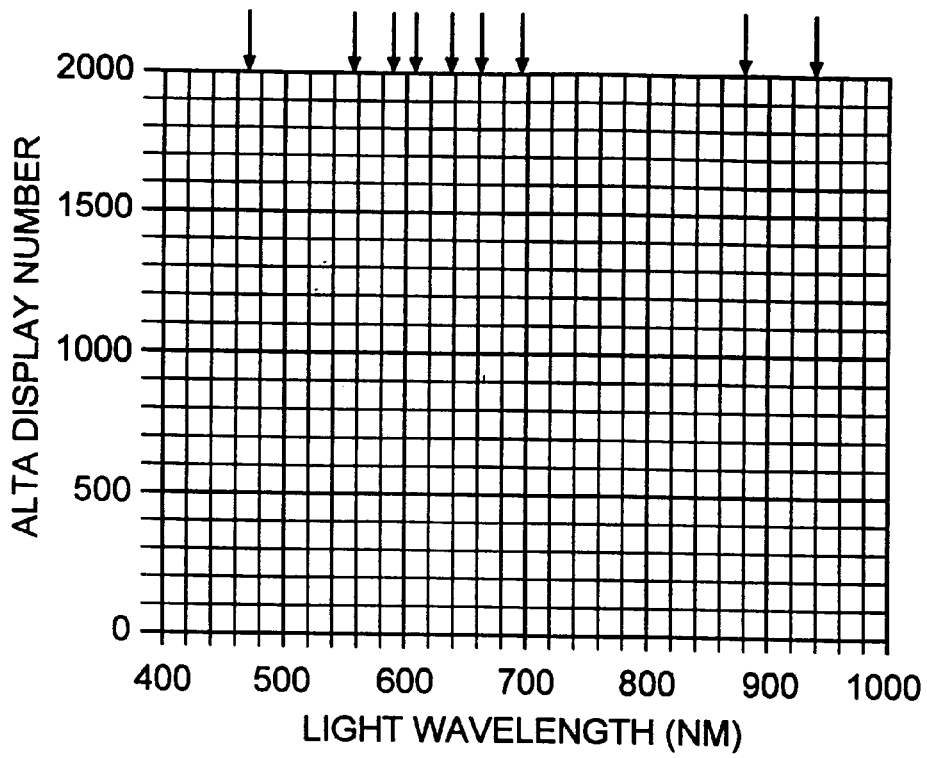
Figure 4F:
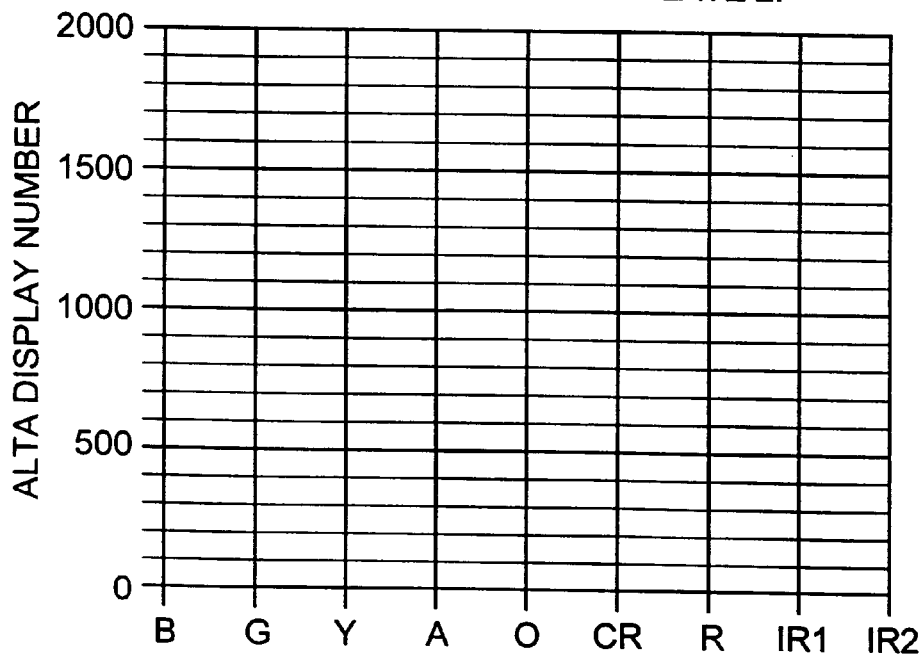
Figure 4G:
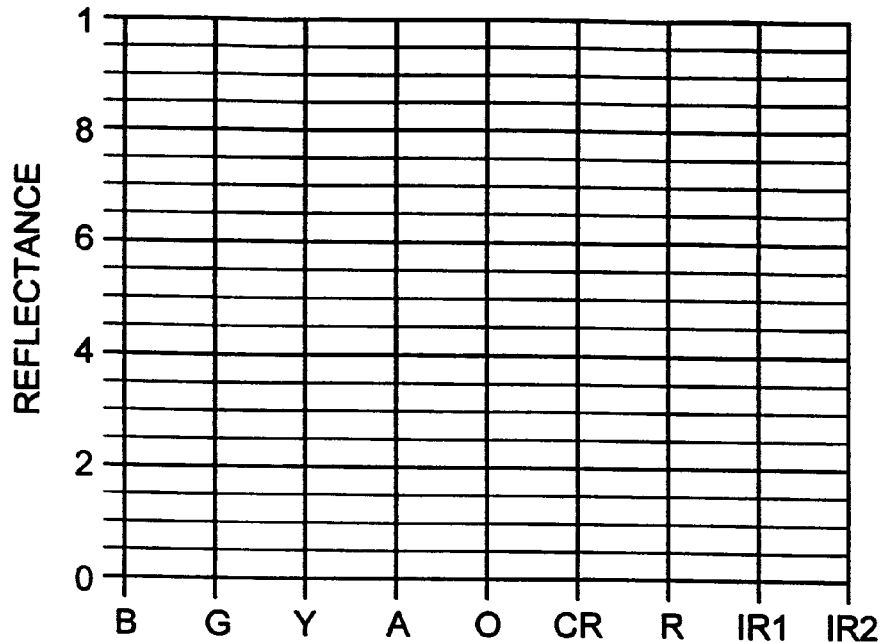
Figure 4H:
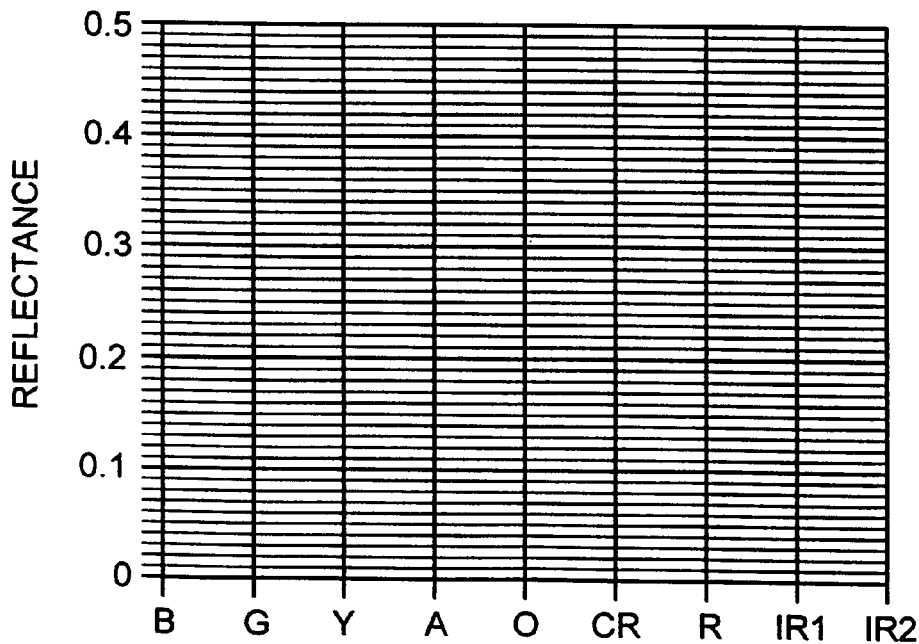
Figure 4I:
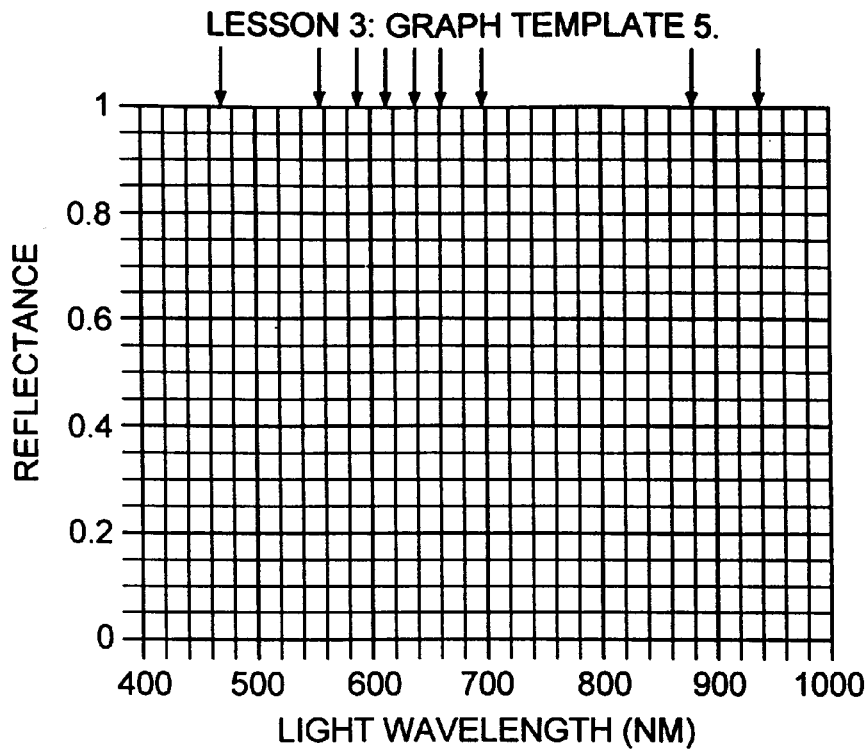
Figure 4J:
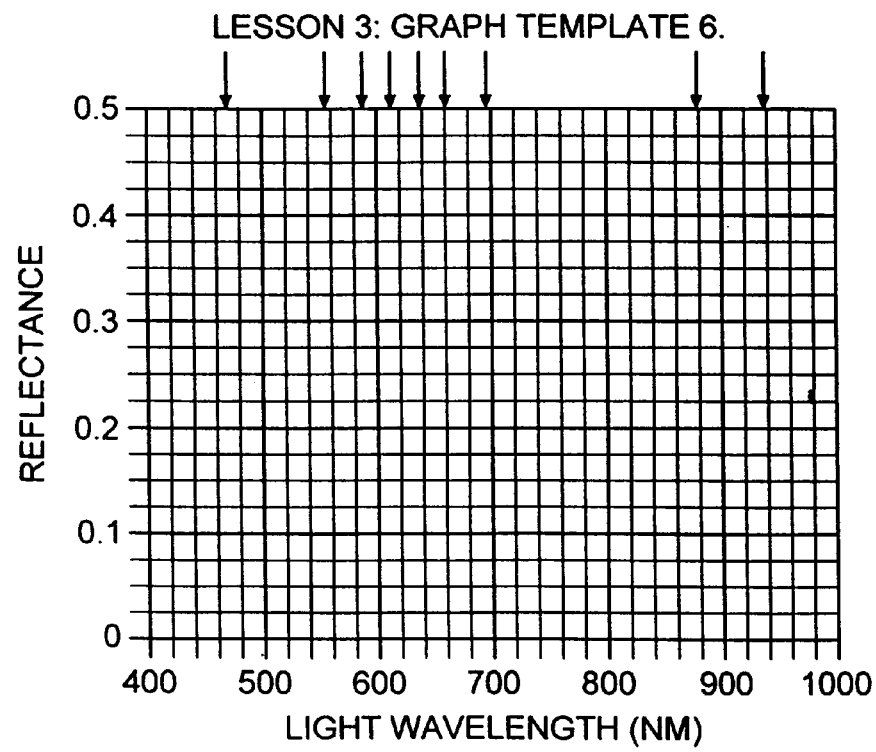

The circuit diagram 200 for a typical embodiment comprises those integrated circuit systems which are depicted in FIGS. 3A, 3B and 3C. There are the interconnected circuits: power supply 210, colored lamp 220, and output or light detector circuitry 230.

The power supply circuitry 210 including battery B1 provides regulated electrical power to the remainder of the electronic system. In the embodiment of FIG. 3A, electrical power is derived initially from a commercial 9 volt battery B1. It is available to the related systems through an on/off switch S1 and is then conditioned to 5 volts by means of a commercial integrated-circuit voltage regulator here LM78L05ACZ or equivalent, U2 and associated capacitors C3, C4. Other embodiments of the power supply system include commercial batteries to produce the appropriate voltage, e.g.: 5 volts from 4 AA cells in series and externally generated power, as from line voltage with transformer and rectifier to yield 5 volts DC.

The colored lamp circuitry 220, identifies plural lamps of varying spectral responses or colors to be activated. See FIG. 3B. In FIGS. 2A and 2C these LED lamps appear as elements 132. The lamps are thus dispersed in parallel circuits, so that they may be activated by pressure switches from the keypad 140, the keys of which are connected at 114 to lamps 132, 132', lamps 132' being of infrared characteristic. Connected to each individual lamp's parallel circuit is a resistor overvoltage protector, not shown, a momentary contact switch, and a brightness control. In the embodiment shown, the lamps include nine commercially available light emitting diodes LEDs, D1 through D7 previously identified as LEDs 132 and 132'. Lamp "colors" include visible D1–D7/132 and infrared (invisible) light D8–D9/132'. Whereas infrared light is not a contributor to visible colors, it is extremely important in remote sensing applications and teaching about them. Overvoltage protection is provided by a current limit resistor, part of the resistor network RN1. Brightness control is achieved via variable resistors RV1 through RV9 inclusive. See Keypad Connector J5. The momentary, pressure responsive contact switches KP1 through KP9 are likewise set on keypad 140 which in turn is affixed to the outside front 100 of the Hand Held Reflectance Spectrometer case. Alternative embodiments of the lamps include providing incandescent lamps with appropriate color filters, fluorescent lamps with appropriate color filters, solid state laser modules, and gas-discharge lamps with appropriate color filters. Each such substitute lamp embodiment would likewise require overvoltage protection and a brightness control, although the operative circuitry will vary in each embodiment.

The light detector circuitry 230 consists of a light-sensor and an amplifier/conditioner to modify the light sensors output for use in the output circuit system. In the embodiment of FIG. 3C, the light detector is a commercial photodiode D10 hereinabove designated 134. When light from the colored lamp system or other sources strikes this photodiode, it generates a small voltage which is proportional to the intensity of the incident light. That retrieved voltage is amplified and buffered by a commercial, operational amplifier, integrated circuit U1A with associated resistors R1 and R2 and capacitors C1 and C2. Other possible embodiments of the light sensors include a phototransistor, a photoresistive cell, e.g.: CdS, a photovoltaic cell, or a bolometric cell. This output circuit 230 enables the amplified, buffered output from the light detector photodiode D10 to be displayed or transmitted to other devices. In the embodiment of FIG. 3C, the output system consists of a commercially available module LCD on the FIG. 3C diagram, containing both an analog-to-digital converter, based upon a commercial integrated circuit, identified as No. 7106 and a liquid crystal display for showing the output from the photo-diode D10. See LCD connections J1–J4 inclusive. In the embodiment of FIG. 3C, diode D11 is also critical to the display system. See Light Detector Circuitry 230 above. D11 provides a secondary ground voltage HGND, one diode voltage drop above system ground, for input to an analog-to-digital converter, not shown. Other embodiments of the output system not shown include an analog voltage meter, transfer of the analog output to an external system which may include analog-to-digital conversion, and transfer of the digitized output to an external system, e.g.: a computer or hand-held calculator.

OPERATION

The first step in operating the Hand Held Reflectance Spectrometer is to turn it on via switch S1 of FIG. 3A, which activates the flow of electric power from the power supply circuitry battery B1 to all electronic components 210, 220, 230. The Spectrometer itself is then placed on a relatively flat object or surface to be investigated, with the exterior surface of the case bottom 150 in contact with the target object or surface. Contact between the object or surface and the case bottom prevents exterior light from impinging on the photo-diode 134. Further, the light access opening 170, being centered directly on the object or surface, allows light from LED lamps 132 to impinge on the object or surface to be investigated, whereupon light reflected or scattered from that object or surface may impinge upon the photo-diode.

The LED lamps 132 are accordingly activated by sequentially pressing on a preselected switch of the membrane keypad 140 of the case top 100. Light from a given activated LED lamp shines onto the object or surface to be analyzed. Some of this incident light reflects or is scattered off the object or surface into the photo-diode 134, where it induces a voltage into the light detection circuit system 230. This induced voltage is amplified, buffered, digitized, and finally displayed as wavelengths in the LCD module 122, which is visible from the top compartment 110 of assembled case 100.

The present Hand Held Reflectance Spectrometer 100 is readily calibrated and standardized, inasmuch as the brightness of respective LED lamps 132, is rendered constant by influence of the voltage regulator U2 in power supply circuit, 210.

A specific example of a classroom laboratory lesson, utilizing this invention, follows. The invention is known in the trade as the ALTA® Reflectance Spectrometer. The present example is derived from FIGS. 4A–4J of Lesson 3 of the Exercise Book, entitled ALTA® Reflectance Spectrometer: Introduction and Classroom Lessons. Copyright © 1998 by the Lunar and Planetary Institute. In FIGS. 4A–4J of Lesson 3, the student uses the ALTA® Reflectance Spectrometer to gather data, standardize that data, and produce a reflection graph of a green leaf.

BACKGROUND

Green leaves are familiar, and most students know that leaves use sunlight, water, and air to make food for plants. In most plants, the chemical chlorophyll absorbs light energy and converts it to the chemical energy of sugars. Chlorophyll absorbs and uses both blue and red light to make sugars; green light is not absorbed very strongly. Leaves also contain other chemical dyes: carotenes and xanthophylls give red, yellow, and orange colors; and flavonoids give pink to purple colors. The colors of leaves, when seen from a satellite or airplane, allow scientists to tell how ripe crops are, how healthy forests are, where pollutants come from, and so on.

PROCEDURE

Preparation

1. Work through the classroom procedure beforehand—take your own reflectance spectrum of a leaf.
2. Photocopy data table and graph templates.
3. Check that all spectrometers are in working order and have batteries.
4. Ensure that calculators are available.

CLASSROOM PROCEDURE—TAKING A REFLECTANCE SPECTRUM

1. Preliminary. Outline for your students the procedures for the laboratory. Hand out the spectrometers, data sheets, and one large green leaf per group.

2. Data collection. Turn the spectrometers on and remind the students how they work. Place each spectrometer, lamp side down, on the target object such as a green leaf so the lamp/sensor array is over the leaf. Note the display number in millivolts when no ALTA® lamps are on; record this on a data sheet as the "dark voltage." Starting with the blue lamp, turn it on by pushing the blue switch pad on the ALTA® face and holding it down. The display number will change from its "dark" value and will become constant (except for random variations in the last few digits) within a few seconds to a minute. When the display number remains nearly constant, record it on the reflectance calculation worksheet, either "simple" or "better" in the "blue" row and the "SAMPLE" column. Using the same procedure, work through the rest of the lamp colors on the ALTA®, recording the display number on the data sheet.

3. Graph raw results. Graph these raw results on the template "ALTA® Display Number vs. Color" or "ALTA® Display Number vs. Wavelength." Does this graph make sense for a green leaf? Sometimes, the number for yellow or blue is larger than the number for green. Sometimes also, the voltage graph shows unexpected bumps, like crimson being much larger than orange or red. There are two reasons for these "anomalies": (1) the colored lamps are different brightnesses (which you can see) and (2) the ALTA®'s light sensor is very sensitive to red and infrared light and barely sensitive to violet light.

How does the leaf's display number for infrared light compare to other colors?

4. Standardization. Take a poll among the students for what their display numbers for green and infrared-1 were. You will find a lot of variation, even though the leaves should be nearly identical. This variation comes from the ALTA® spectrometers. Because of variations in the manufacture of the electrical components, lamps, and light sensor, each ALTA® has its own unique sensitivity to light, within limits, of course.

To correct for these differences between instruments and to move the measurement closer to what happens to the light, measurement of light reflectance is given as the percentage or proportion of light (for each wavelength or color) that reflects from the leaf. The display number measurements indicate how much light (of each color) has reflected from the leaf, but how much light hit the leaf to start with?

One way to measure how much light hits the leaf, and how much is reflected, is to take reflectance measurements of a standard material—something from which we think we know how much light is reflected. Good standards for this experiment are heavy white paper or white poster board, which reflect almost all of the light that hits them, about 85%. White photocopy paper or notebook paper is OK but not ideal—it is thinner than construction paper and allows some light to pass through it (which you can see).

To measure the reflectance standard, put the spectrometer on your piece of white paper and again measure the spectrometer's output voltage for each lamp. Write these numbers in the worksheet in the column labeled "Standard White Paper."

With the "Standard" data, we can now calculate the proportion (or percentage) of light reflected by the leaf. For each color, simply divide the display voltage number for the leaf by the display voltage number for the white paper. This value is called the reflectance.

Reflectance=(Display number for sample)÷(Display number for white paper).

To convert this reflectance proportion to a percentage, simply multiply by 100.

For your data, calculate the reflectance (and/or percent reflectance), and write them in the table on the worksheet.

If your class is using the "better" worksheet, follow this procedure: The spectrometer display number is usually not zero when there is no light on the sensor. The display value is usually between zero and 150—this is called the "dark voltage." It comes entirely from the sensor, not from light hitting the sensor. To get a real reflectance value, you should subtract the dark voltage from the measured voltages, and then divide the sample by standard:

$$\text{Reflectance} = \frac{(\text{Display voltage for sample} - \text{dark voltage})}{(\text{Display voltage for standard} - \text{dark voltage})}$$

5. Graph. Graph your standardized reflectance data (as proportions) on suitable graph paper (either the "Reflectance vs. color" or "Reflectance vs. light wavelength" templates). This graph is a reflectance spectrum.

6. Discussions.

(a) Is your reflectance spectrum of a leaf reasonable? Compare your leaf spectra to the reference reflectance spectrum of spinach. The spinach reflectance spectrum was taken by the U.S. Army Corps of Engineers in a laboratory using high-tech equipment. While you took measurements at nine different colors of light, the Army Corps took measurements at hundreds of different colors, from violet through infrared. Are your measurements similar to those in the Army's spectrum of spinach? Is your leaf lighter or darker than the spinach (i.e., are your leaf's reflectance values greater or smaller than the spinach's)? Why does the Army's spectrum of spinach show many more wiggles and bumps than yours? These features include the sharpness of the green reflectance peak, the shoulder on the yellow side of the green reflectance peak, and the steep rise from red into infrared. Do you think that your leaf spectrum might have similar detail, if you could have measured at hundreds of colors, too?

(b) Biological cause of leaf color. Why do leaves reflect so much infrared light? Try asking the question another way: Why do leaves reflect so little visible light? What benefit does the leaf or plant get from absorbing visible light, especially blue and red light? What does the plant do with the light it absorbs? What chemical makes leaves green? chlorophyll. What other colors of pigment are in leaves? Think about the colors of very young leaves and of dying leaves, especially in the fall. What benefit might a plant get from having pigments in its leaves? The red-yellow colors, which mean absorption of blue light, might protect plants, especially young leaves from sunburn.

Whereas the present invention is described in detail in the foregoing preferred embodiments and demonstrated in its examples thereof, it is subject to alterations and modifications by those skilled in the art. Such alterations and modifications, inherent in the invention, are encompassed within the scope of invention as hereinafter claimed.

We claim:

1. A manually portable classroom reflectance spectrometer, for hand-held classroom use by students, whereby the reflectance of electromagnetic radiations of multiple wavelengths of targets may be visualized, comprising:

a) a topmost compartment (110), said compartment defining a display aperture (120) and containing an adjacent LCD display module (122); a printed circuit board (130) on an obverse side of the compartment (110); said circuit board supporting a circular array of plural LEDs (132), (132'), at least one LED (132') comprising an infrared light; a photodiode light sensor (134) disposed centrally of the LED array, said photodiode being sheathed in an opaque cylinder that extends beyond the end of the photodiode; an externally disposed color coded switch keypad (140);

b) a bottommost compartment (150) removably secured to said topmost compartment; a light access aperture (170) on an obverse surface of compartment (150), respective dispositions of the array (132), (132') and the light access aperture being in coactive alignment;

c) coactive electronic components comprising a battery power supply (210), integrated colored lamp circuitry (220) with light detection circuit (230) and switch means therefor, said electronic components being coactively retained by topmost and bottommost compartments (110) and (150).

2. The portable reflectance spectrometer of claim 1 wherein the disposition of LED array (132), (132') to light sensor (134) is such that an imaginary axis line extending vertically through the light sensor (134) intercepts imaginary axis lines of respective LEDs of the array (132) at acute angles of incidence, said angles being in excess of 0° and less than 90°, the intersection of all said lines being immediately adjacent the exterior of LCD display module (122).

3. The portable reflectance spectrometer of claim 2 wherein the intercepting angles of incidence of LEDs (132), (132') are at least 30° from an extended vertical axis line of the light sensor (134).

4. The portable classroom reflectance spectrometer of claim 1 wherein the colored lamp circuitry (220) includes for the respective LEDs, a keypad connector and resistor network, the light detection circuit (230) including a photodiode (134/D10).

5. The portable classroom reflectance spectrometer of claim 4 wherein the intercepting angles of incidence of LEDs (132), (132') are respectively at least 30° from an extended vertical axis line of the light sensor (134).

* * * * *